United States Patent
Karuppusamy et al.

(10) Patent No.: US 10,417,181 B2
(45) Date of Patent: Sep. 17, 2019

(54) USING LOCATION ADDRESSED STORAGE AS CONTENT ADDRESSED STORAGE

(71) Applicant: HEWLETT PACKARD ENTERPRISE DEVELOPMENT LP, Houston, TX (US)

(72) Inventors: Ramesh Kannan Karuppusamy, Bangalore (IN); Rajkumar Kannan, Bangalore (IN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 324 days.

(21) Appl. No.: 15/307,457

(22) PCT Filed: Jul. 22, 2014

(86) PCT No.: PCT/US2014/047596
§ 371 (c)(1),
(2) Date: Oct. 28, 2016

(87) PCT Pub. No.: WO2015/178944
PCT Pub. Date: Nov. 26, 2015

(65) Prior Publication Data
US 2017/0052972 A1  Feb. 23, 2017

(30) Foreign Application Priority Data

May 23, 2014  (IN) ............... 2575/CHE/2014

(51) Int. Cl.
*G06F 16/14* (2019.01)
*G06F 16/13* (2019.01)
(Continued)

(52) U.S. Cl.
CPC ........ *G06F 16/152* (2019.01); *G06F 11/1004* (2013.01); *G06F 16/122* (2019.01); *G06F 16/13* (2019.01); *G06F 16/137* (2019.01)

(58) Field of Classification Search
CPC ......... G06F 17/30082; G06F 17/30109; G06F 16/137; G06F 16/122; G06F 16/152; G06F 16/13; G06F 11/1004
(Continued)

(56) References Cited

U.S. PATENT DOCUMENTS 3,601,809 A * 8/1971 Gray .................. G06F 5/14
711/214
5,634,063 A * 5/1997 Ahn .................. G06N 3/063
706/25
(Continued)

FOREIGN PATENT DOCUMENTS

WO  2015/167493 A1  11/2015

OTHER PUBLICATIONS

Rhea, Sean, et al., "Fast, Inexpensive Content-Addressable Storage in Foundation", ATC '08, USENIX 2008 Annual Technical Conference, Boston, MA, Jun. 22-27, 2008, pp. 143-156.*
(Continued)

*Primary Examiner* — Robert Stevens
(74) *Attorney, Agent, or Firm* — Hewlett Packard Enterprise Patent Department

(57) ABSTRACT

Some examples describe a method for using location addressed storage as content addressed storage (CAS). A checksum of a file may be generated during transition of the file to a retained state. The generated checksum, which may represent a content address of the file, may be stored in a database. The database may be queried with the content address of the file to retrieve a location address of the file corresponding to the content address of the file. The location
(Continued)

address of the file is used to provide access to the file in the file system.

18 Claims, 5 Drawing Sheets

(51) Int. Cl.
*G06F 16/11* (2019.01)
*G06F 11/10* (2006.01)

(58) Field of Classification Search
USPC .......................................................... 707/706
See application file for complete search history.

(56) References Cited

U.S. PATENT DOCUMENTS

| | | | |
|---|---|---|---|
| 6,226,710 B1 | 5/2001 | Melchior | |
| 7,162,571 B2* | 1/2007 | Kilian | G06F 3/0611 |
| | | | 707/E17.01 |
| 7,366,836 B1* | 4/2008 | Todd | G06F 3/0605 |
| | | | 711/114 |
| 7,444,389 B2* | 10/2008 | Kilian | G06F 17/30949 |
| | | | 707/E17.005 |
| 7,529,883 B2* | 5/2009 | Kilian | G06F 3/0611 |
| | | | 711/108 |
| 7,640,406 B1 | 12/2009 | Hagerstrom et al. | |
| 7,685,177 B1* | 3/2010 | Hagerstrom | G06F 16/185 |
| | | | 707/999.204 |
| 8,055,599 B1 | 11/2011 | Werth | |
| 8,468,297 B2* | 6/2013 | Bhattacharya | G06F 12/0864 |
| | | | 711/108 |
| 8,984,031 B1* | 3/2015 | Todd | G06F 17/30312 |
| | | | 707/823 |
| 9,020,994 B1* | 4/2015 | Hilliar | G06F 12/12 |
| | | | 707/809 |
| 9,495,435 B2* | 11/2016 | Zhang | G06F 17/30581 |
| 2004/0172400 A1* | 9/2004 | Zarom | G06F 16/90339 |
| 2006/0155915 A1 | 7/2006 | Pereira | |
| 2008/0228697 A1* | 9/2008 | Adya | G06F 17/30595 |
| 2009/0228511 A1 | 9/2009 | Atkin et al. | |
| 2010/0070698 A1* | 3/2010 | Ungureanu | G06F 17/30067 |
| | | | 711/108 |
| 2011/0307451 A1* | 12/2011 | El Haddi | G06F 17/30073 |
| | | | 707/673 |
| 2012/0215980 A1 | 8/2012 | Auchmoody et al. | |
| 2013/0198462 A1 | 8/2013 | Serlet et al. | |
| 2014/0372393 A1 | 12/2014 | Gosnell | |
| 2015/0161153 A1* | 6/2015 | Gheith | G06F 17/30091 |
| | | | 707/695 |
| 2016/0350175 A1 | 12/2016 | Nazari et al. | |

OTHER PUBLICATIONS

Chisvin, Lawrence, et al., "Content-Addressable and Associative Memory: Alternatives to the Ubiquitous RAM", Computer, vol. 22, Issue 7, Jul. 1989, pp. 51-64.*
Tolia, Niraj, et al., "Opportunistic Use of Content Addressable Storage for Distributed File Systems", USENIX 2003, San Antonio, TX, Jun. 9-14, 2003, 14 pages.*
Berrey, A., "Content-Addressable Distributed File System ("Keep")," (Web Page), Apr. 17, 2013, 5 pages, available at https://arvados.org/projects/arvados/wiki/Keep.
International Search Report & Written Opinion received in PCT Application No. PCT/US2014/047596, dated Jan. 28, 2015, 13 pages.
Nath, P. et al., "Evaluating the Usefulness of Content Addressable Storage for High-performance Data Intensive Applications," (Research Paper), Jun. 23-27, 2008, 10 pages, available at http://www.cse.psu.edu/~bhuvan/papers/ps/cas-hpdc08.pdf.
Wikipedia, "Content-addressable storage," Jan. 12, 2014, 4 pages.
International Preliminary Report on Patentability received for PCT Patent Application No. PCT/US2014/047596, dated Dec. 8, 2016, 10 pages.
ProStor Systems, "ProStor InfiniVault Frequently Asked Questions" available online at <http://www.newwavetech.com/ETIMPDF/ProStor%20InfiniVault%20FAQs.pdf>, 2009, 3 pages.

* cited by examiner

USING LOCATION ADDRESSED STORAGE AS CONTENT ADDRESSED STORAGE

BACKGROUND

Storage systems are inevitable in modern day computing. Whether it is a general purpose computing device or a large data center of an enterprise, storage systems have become a key part of any computing experience. Over the years, storage system technologies have evolved from storing just a few bytes of data to multi petabytes of data. In terms of nomenclature, storage systems may be divided into various types. According to one classification, storage systems may be divided into two types on the basis of access to data stored in a storage device: location addressed storage system and content addressable storage (CAS) system.

BRIEF DESCRIPTION OF THE DRAWINGS

For a better understanding of the solution, embodiments will now be described, purely by way of example, with reference to the accompanying drawings, in which.

DETAILED DESCRIPTION OF THE INVENTION

Figure 1:
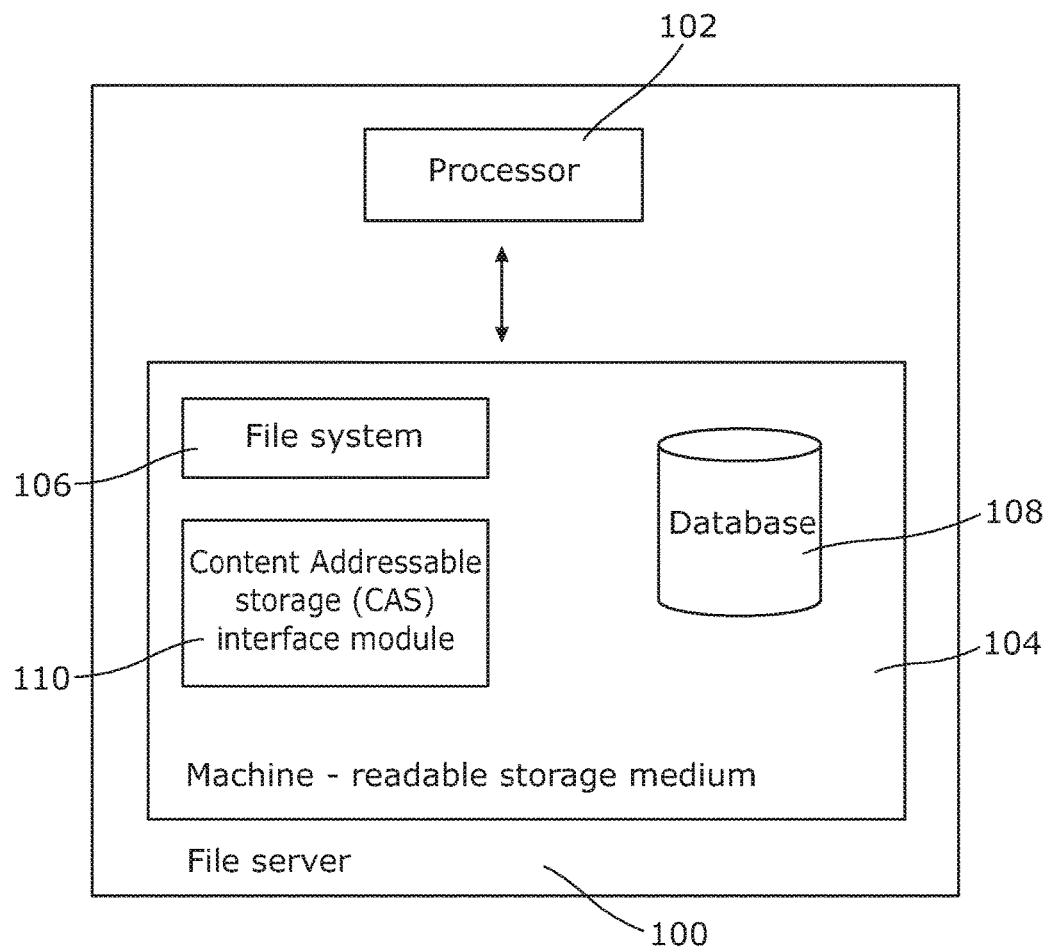
FIG. 1 is a block diagram of an example computing device that facilitates using location addressed storage as content addressable storage (CAS)

As mentioned earlier, according to a classification, storage systems may be of two types: location addressed storage system and content addressable storage system (CAS). In location-addressed storage system, each file is retrieved based on the location where it is stored. On the other hand, in a content addressable storage system (CAS), physical location of a stored object (for example, a file) is immaterial. A storage object may be accessed from its location via a unique identifier called a content address. A content address may be used to locate, retrieve, and validate a storage object.

A CAS system creates a unique global ID (content address) for each storage object and may store one or more copies of data on different storage devices. A CAS system may retrieve data from one of the stored locations by processing the unique global ID supplied by a client system. In an example, a content address may be based on a cryptographic digest of the data in a stored object.

A CAS system may be used for long-term retention of content, for example, for compliance or regulatory purposes, or for archiving a large number of records that may not change over time. A CAS system ensures consistency of stored data i.e. whatever is saved in a CAS storage system is exactly what comes out.

A retention enabled file system allows users to apply retention settings on a file such that a file may be retained in the system for a period set by a user. The retention feature may allow users to retain files up to a hundred years or more. When a file is retained it can neither be modified nor be deleted. Even after retention period expires the file can't be modified but may become eligible for deletion. This state of the file is called WORM (Write Once Read Many).

Location addressed storage system is more commonly used as compared to a CAS system since the latter may require special hardware or software (file system) resources. A CAS system, therefore, may require additional investments from a user. Presently, there's no available storage solution that provides flexibility to use location addressed storage hardware and file system as content addressable storage. A traditional storage system does not provide access to data using both content addressable and location addressable capabilities.

The present disclosure describes a mechanism for using a location addressed storage system as content addressable storage system (CAS). In an example, the present disclosure may describe generating a checksum of a file during transition of a file to a retained state in a file system. The generated checksum, which may represent a content address of the file, may be stored in a database. The database may be queried with the content address of the file to retrieve a location address of the file corresponding to the content address of the file. The location address of the file is then used to provide access to the file in the file system.

Examples described herein provide flexibility to use location addressed storage hardware and file system as content addressable storage. It obviates the requirement of using a dedicated storage appliance to address the need for content addressable storage (CAS). Examples described herein stand out from such solutions by making existing location addressed storage as content addressable storage.

FIG. 1 is a block diagram of an example computing device 100 that facilitates using location addressed storage as content addressable storage (CAS). Computing device 100 may be a server, a desktop computer, a notebook computer, a tablet computer, and the like. In an example, computing device 100 may be a file server 100. File server 100 may include a processor 102 and a machine-readable storage medium 104.

Processor 102 may be any type of Central Processing Unit (CPU), microprocessor, or processing logic that interprets and executes machine-readable instructions stored in machine-readable storage medium 104.

Machine-readable storage medium 104 may be a random access memory (RAM) or another type of dynamic storage device that may store information and machine-readable instructions that may be executed by processor 102. For example, machine-readable storage medium 104 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium 104 may be a non-transitory machine-readable medium.

In an example, machine-readable storage medium 104 may store a file system 106, a database 108 and a content addressable storage (CAS) interface module 110. The term "module" may refer to a software component (machine readable instructions), a hardware component or a combination thereof. A module may include, by way of example, components, such as software components, processes, tasks, co-routines, functions, attributes, procedures, drivers, firmware, data, databases, data structures, Application Specific Integrated Circuits (ASIC) and other computing devices. A module may reside on a volatile or non-volatile storage medium (e.g. 104) and configured to interact with a processor (e.g. 102) of a computing device (e.g. 100).

In general, file system 106 may be used for storage and retrieval of data from a storage device. Typically, each piece of data is called a "file" (or file object). File system 106 may be a local file system or a scale-out file system such as a shared file system or a network file system. Examples of a shared file system may include a Network Attached Storage (NAS) file system or a cluster file system. Examples of a network file system may include a distributed file system or a distributed parallel file system. File system 106 may allow a user to apply retention settings on a file such that the file is retained in the system for a period set by the user. When a file transitions from a normal state to a retained state (i.e. upon application of retention settings), a checksum (hash) of the file may be generated using a hash algorithm and stored in database (example, 108). The generated checksum represents a content address of the file. Thus, a file (or file object) may be location addressable as long as the content of a file changes (i.e. no retention settings are applied to the file). A file (or file object) may become content addressable after file content is marked as retained (i.e. retention settings are applied to the file). Some non-limiting examples of hash algorithms that may be used for generating a checksum of a file (or duplicate of a file) may include SHA, SHA-1, MD2, MD4, and MD5. In an instance, file system 106 may generate a notification event during transition of a file from a normal state to a retained state. A retained file may neither be modified nor deleted for a specified period depending upon the applied retention settings.

Database 108 may be a repository that stores an organized collection of data. In an example, database 108 may store a checksum of a file which, in an example, represents a content address of the file. A checksum of a file may be generated during transition of the file to a retained state i.e. once retention settings are applied to the file. Apart from the generated checksum, the database 108 may also store other attributes of a file such as, but not limited to, a unique ID of the file, file path, etc. In an example, database 108 may be queried using content address of a file (or file object) when an application (for instance, a CAS client) requests access to the file (or file object).

In an example, database 108 may be a distributed database that provides high query rates and high-throughput updates using a batching process. Database 108 may use a pipelined architecture that provides access to update batches at various points through processing. In an instance, database 108 may be based on a batched update model, which decouples update processing from read-only queries (i.e. query processing task). In this model, the updates may be batched and processed in the background, and do not interfere with the foreground query workload. Database 108 may allow different stages of the updates in the pipeline to be queried independently. Queries that could use slightly out-of-date data may use only the final output of the pipeline, which may correspond to the completely ingested and indexed data. Queries that require even fresher results may access data at any stage in the pipeline. Database 108 may be a metadata database that stores metadata related to unstructured data. Examples of unstructured data may include documents, audio, video, images, files, body of an e-mail message, Web page, or word-processor document. In an example, database 108 may be integrated into file system 106.

Content addressable storage (CAS) interface module 110 may include instructions to query database 108 with the content address of a file. Upon querying the database 108, CAS interface module 110 may retrieve a location address of the file corresponding to the content address of the file, and use the location address of the file to provide access to the file in a file system (example, 106). In an example, an application stored on a client system, which may be communicatively coupled to computing device 100, may request CAS interface module 110 to lookup a file (or file object) in a file system (example, 106). In such case, said application may provide the content address of the file (or file object) which the application wants to access to CAS interface module 110. CAS interface module 110 then may query a database (example, 108) with the content address of the file to retrieve a location address (path) of the file for the given content address. As mentioned earlier, a database may store various attributes of a file such as, but not limited to, a unique ID of the file, file path, etc. Thus, a content address (hash) of a file (or file object) may be mapped to a location address (path) of said file (or file object).

The location address of the file may be used by CAS interface module 110 to search for the file (or file object) in a file system (example, 106). In an example, in response to said search or file lookup, the file system (example, 106) may provide a handle for the file (or file object) to CAS interface module 110. CAS interface module 110 may in turn provide the file handle to the application that had originally requested access to the file (or file object). In such manner, using the file handle, a client application may read the file (or file object) present in a file system (example, 106). Thus, a mapping between content address (hash) and location address (path) of a file (or file object) is used to provide access to the file (or file object).

Figure 2:
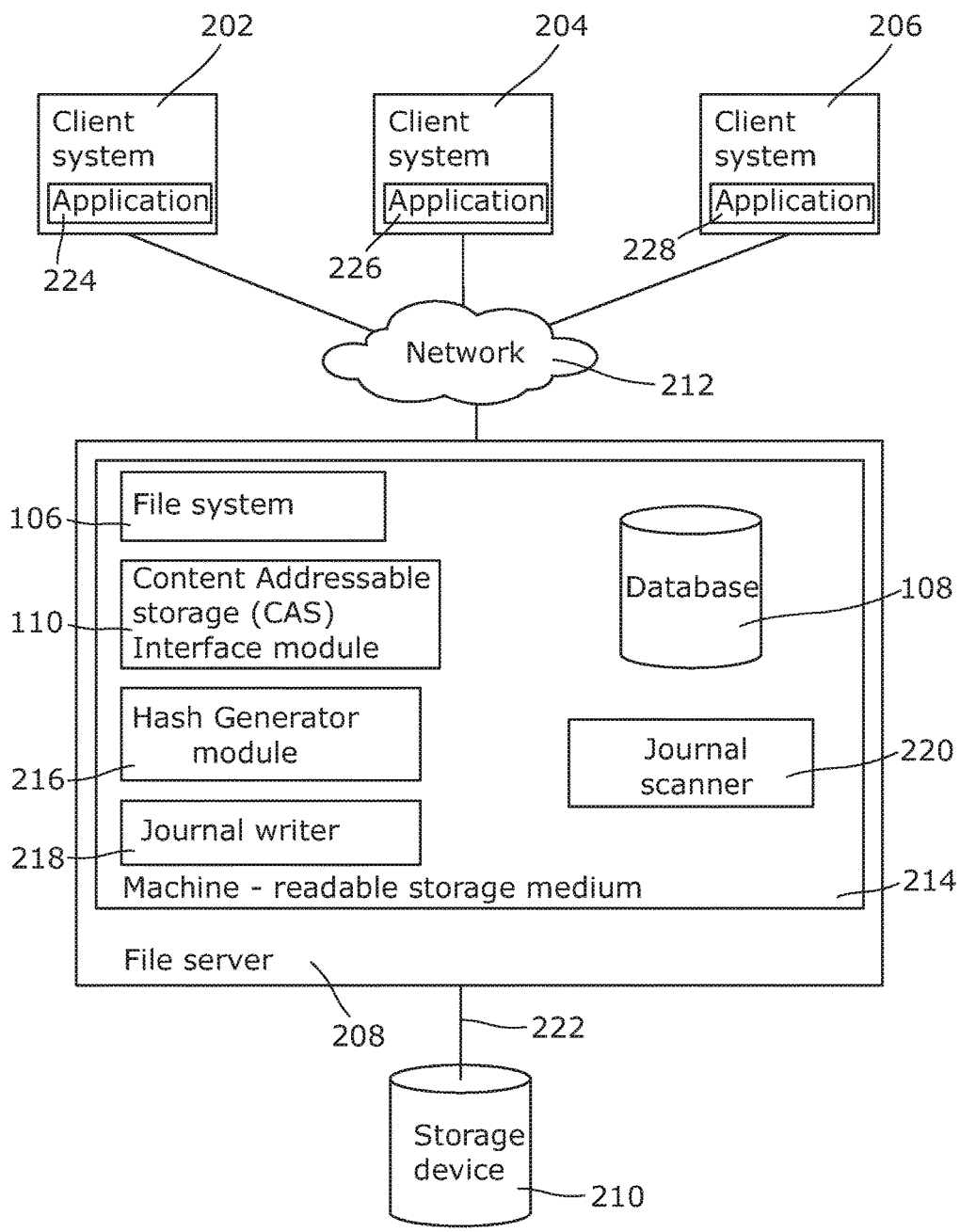
FIG. 2 is a block diagram of an example computing environment that facilitates using location addressed storage as content addressable storage (CAS)

FIG. 2 is a block diagram of an example computing environment 200 that facilitates using location addressed storage as content addressable storage (CAS). Computing environment 200 may include client systems 202, 204, and 206, a file server 208, and a storage device 210. The number of client systems 202, 204, and 206, file server 208, and storage device 210 shown in FIG. 1 is for the purpose of illustration only and their number may vary in other implementations. In an example, computing environment 200 may represent a scale-out file system.

Client systems 202, 204, and 206 may each be a computing device such as a desktop computer, a notebook computer, a tablet computer, a mobile phone, personal digital assistant (PDA), a server, and the like. In an example, client systems 202, 204, and 206 may host one or more applications 224, 226, and 228 that may use a file system (example, 106) on file server (example, 208) for data storage and retrieval. In an instance, application 224, 226, and 228 may be a content addressable storage (CAS) client application that may request access to a file (or file object) in a file system (example, 106). Application 224, 226, and 228 may request access to a file (or file object) in a file system (example, 106) by sharing the content address of a file with CAS interface module (example, 110) which in turn may provide such access by querying a database (example, 108) and retrieving a location address of the file corresponding to the content address of the file.

Client systems 202, 204, and 206, may communicate with file server 208 via a computer network 212. Computer network 212 may be a wireless or wired network. Computer network 212 may include, for example, a Local Area Network (LAN), a Wireless Local Area Network (WAN), a Metropolitan Area Network (MAN), a Storage Area Network (SAN), a Campus Area Network (CAN), or the like. Further, computer network 212 may be a public network (for example, the Internet) or a private network (for example, an intranet).

File server 208 may include a non-transitory machine-readable storage medium 214 that may store machine executable instructions. In an example, file server 208 may be similar to file server 100 described earlier. Accordingly, components of file server 208 that are similarly named and illustrated in file server 100 may be considered similar. For the sake of brevity, components or reference numerals of FIG. 2 having a same or similarly described function in FIG. 1 are not being described in connection with FIG. 2. Said components or reference numerals may be considered alike.

In an example, machine-readable storage medium 214 may store a file system 106, a database 108, a content addressable storage (CAS) interface module 110, a hash generator module 216, a journal writer 218, and a journal scanner 220.

A hash generator module 216 may include instructions to generate a checksum of a file when the file transitions from a normal state to a retained state. In an instance, when a file transitions to a retained state, a notification event may be generated by file system 106. This notification event acts as a cue for hash generator module 216 to generate a checksum of a file that transitions to a retained state. The generated checksum may be sent to a journal writer 218 (present in the file system kernel module) which may include instructions to generate a journal for the checksum generation.

Journal scanner 220 may include instructions to process a journal generated by journal writer 218. Upon processing of a journal for checksum generation, journal scanner 220 may insert the generated checksum into database 108. Journal scanner 220 may also insert various file attributes such as, but not limited to, a unique ID of the file, file path, etc. in database 108.

Storage device 210 may be used to store and retrieve data stored by file system 106. Some non-limiting examples of storage device 210 may include a Direct Attached Storage (DAS) device, a Network Attached Storage (NAS) device, a tape drive, a magnetic tape drive, or a combination of these devices. Storage device 210 may be directly coupled to file server 106 or may communicate with file server 106 via a computer network 222. Such a computer network 222 may be similar to the computer network 212 described above. In an example, computer network 222 may be a Storage Area Network (SAN).

Figure 3:
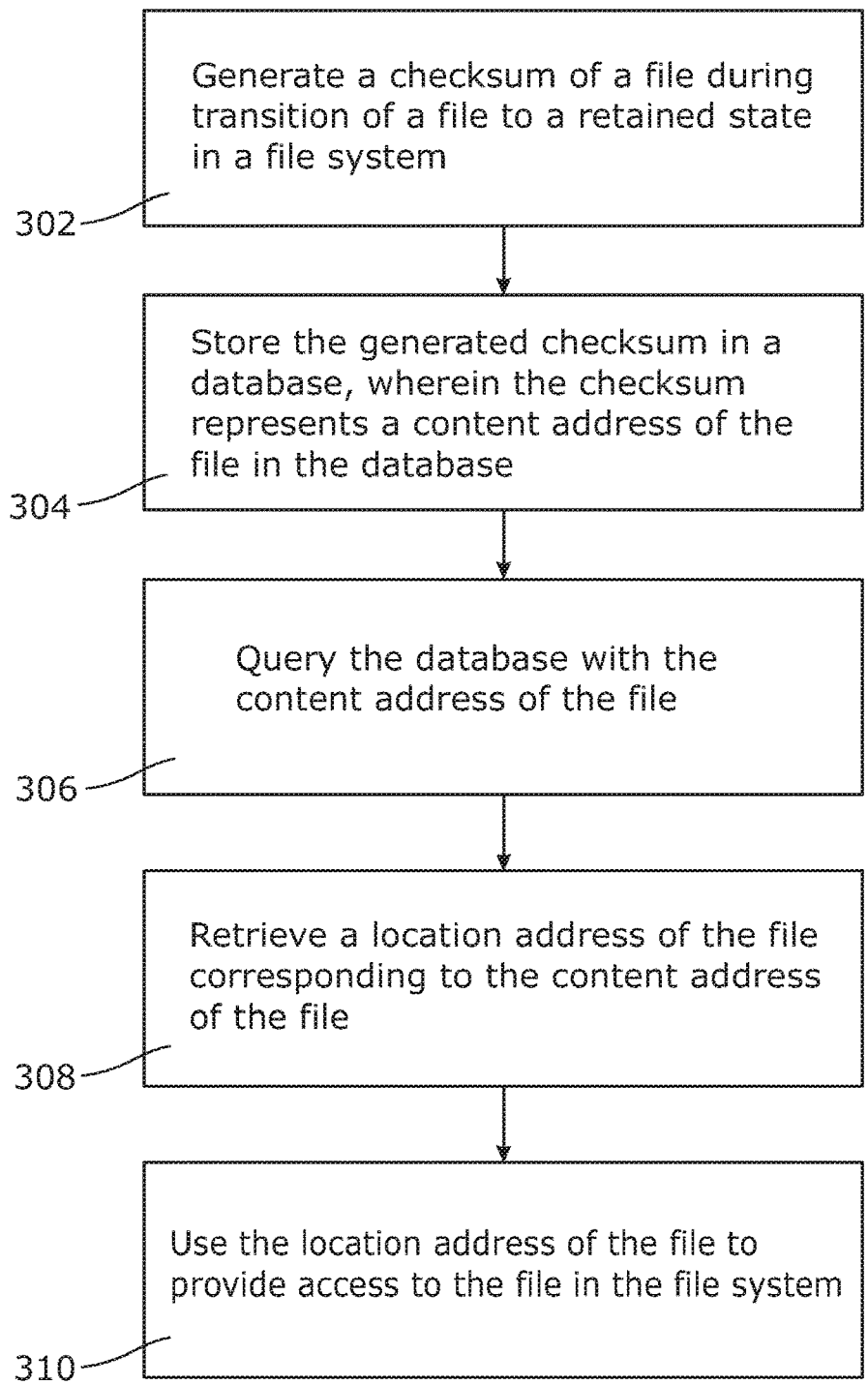
FIG. 3 is a flowchart of an example method for using location addressed storage as content addressable storage (CAS)

FIG. 3 is a flowchart of an example method 300 for using location addressed storage as content addressable storage (CAS). The method 300, which is described below, may at least partially be executed on a computing device 100 of FIG. 1 or file server 208 of FIG. 2. However, other computing devices may be used as well. At block 302, a checksum of a file may be generated during transition of the file from a normal state to a retained state in a file system (example, 106). At block 304, the generated checksum, which may represent a content address of the file, may be stored in a database (example, 108). At block 306, database (example, 108) may be queried with the content address of the file (i.e. checksum of a file). In an example, the content address of a file is received from an application requesting access to the file in a file system (example, 106). At block 308, a location address of the file corresponding to the content address of the file may be retrieve from the database (example, 108). At block 310, the location address of the file may be used to provide access to the file in the file system (example, 106). In an example, using the location address of a file to provide access to the file in the file system may include performing a search for the file in the file system (example, 106) using the location address of the file, and retrieving a file handle of the file from the file system (example, 106). In an example, said file handle may be shared with a content addressable storage (CAS) client application requesting access to the file.

Figure 4:
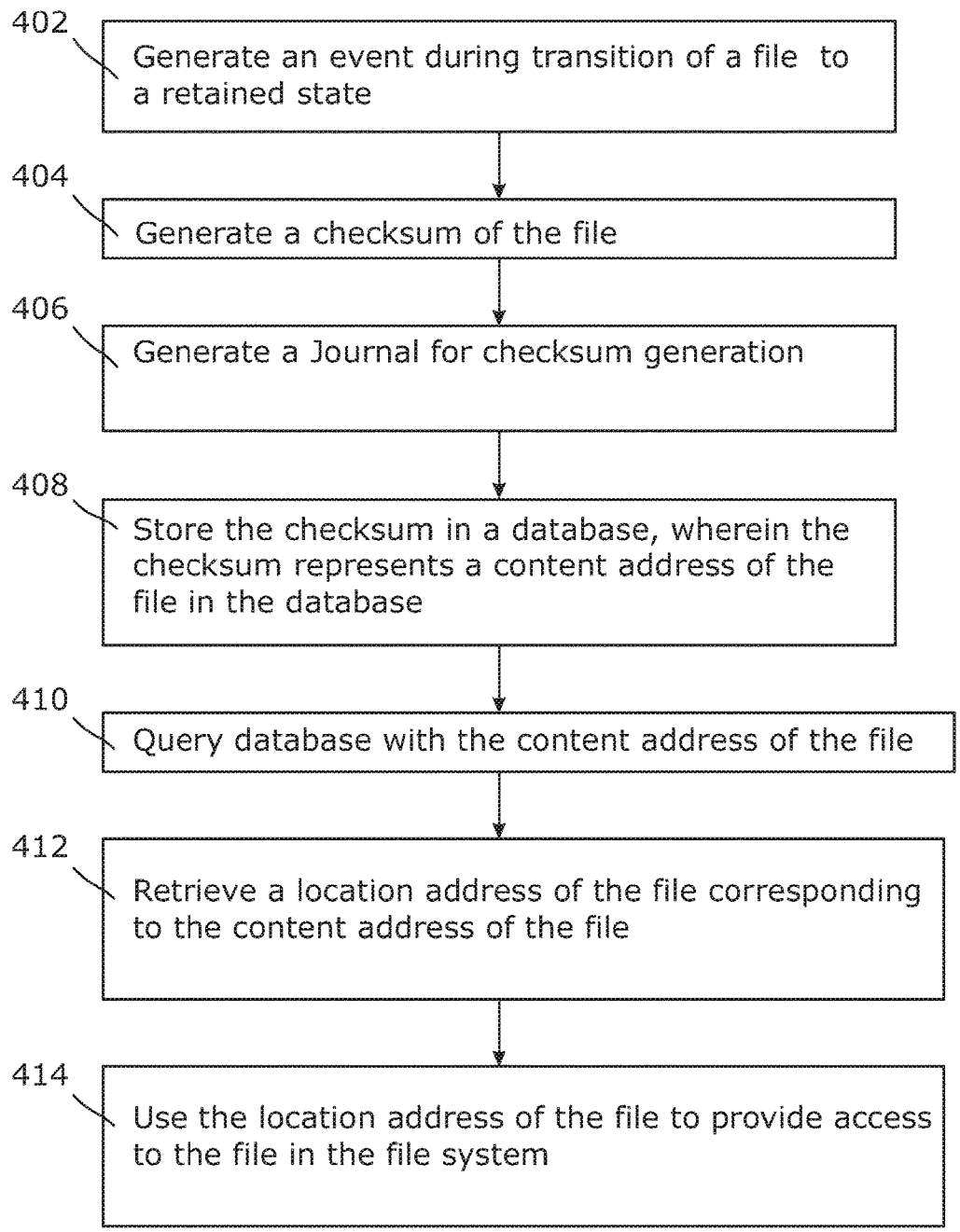
FIG. 4 is a flowchart of an example method for using location addressed storage as content addressable storage (CAS)

FIG. 4 is a flowchart of an example method 400 for using location addressed storage as content addressable storage (CAS). The method 400, which is described below, may at least partially be executed on a computing device 100 of FIG. 1 or file server 208 of FIG. 2. However, other computing devices may be used as well. At block 402, an event may be generated by a file system during transition of file from a normal state to a retained state. At block 404, upon generation of the event, a hash generator module (example, 216) may generate a checksum of the file transitioned to the retained state. In an example, said checksum of a file represents a content address of the file. At block 406, a journal writer (example, 218) may generate a journal for the checksum generation. At block 408, a journal scanner (example, 220) may process the journal and store the generated checksum in a database (example, 108). Journal scanner (example, 220) may store various attributes of the file in the database (example, 108) as well. At block 410, database (example, 108) may be queried with the content address of a file (i.e. checksum of a file) stored in the database. In an example, the content address of a file is received from an application requesting access to the file in a file system (example, 106). At block 412, a location address of the file corresponding to the content address of the file may be retrieved from the database (example, 108). At block 414, the location address of the file may be used to provide access to the file in the file system (example, 106). In an example, using the location address of the file to provide access to the file in the file system may include performing a search for the file in the file system (example, 106) using the location address of the file, and retrieving a file handle of the file from the file system (example, 106). In an example, said file handle may be shared with a content addressable storage (CAS) client application requesting access to the file.

Figure 5:
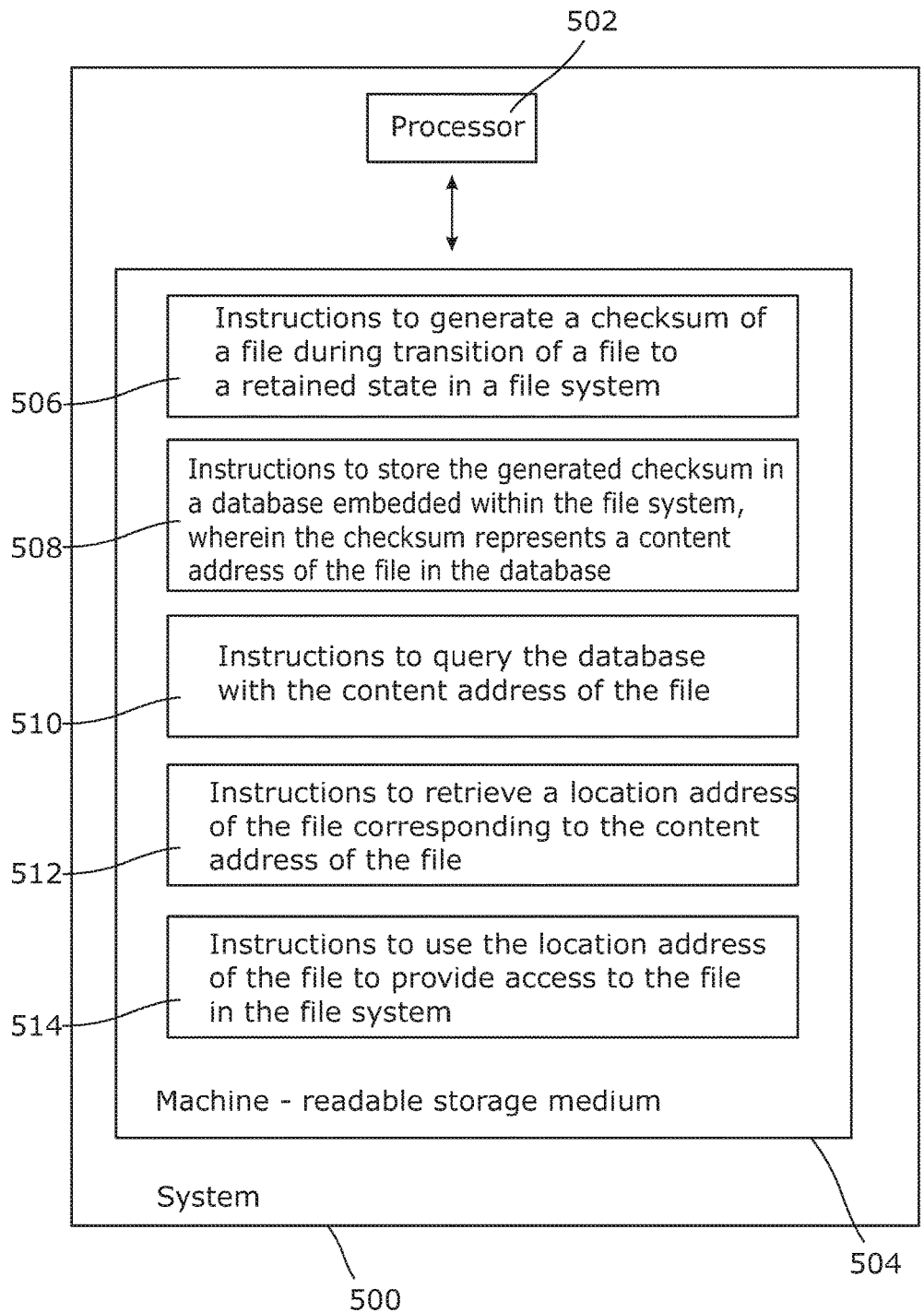
FIG. 5 is a block diagram of an example system that facilitates using location addressed storage as content addressable storage (CAS).

FIG. 5 is a block diagram of an example system 500 that facilitates for using location addressed storage as content addressable storage (CAS). System 500 includes a processor 502 and a machine-readable storage medium 504 communicatively coupled through a system bus. In an example, system 500 may be analogous to computing device 100 of FIG. 1 or file server 208 of FIG. 2. Processor 502 may be any type of Central Processing Unit (CPU), microprocessor, or processing logic that interprets and executes machine-readable instructions stored in machine-readable storage medium 504. Machine-readable storage medium 504 may be a random access memory (RAM) or another type of dynamic storage device that may store information and machine-readable instructions that may be executed by processor 502. For example, machine-readable storage medium 504 may be Synchronous DRAM (SDRAM), Double Data Rate (DDR), Rambus DRAM (RDRAM), Rambus RAM, etc. or a storage memory media such as a floppy disk, a hard disk, a CD-ROM, a DVD, a pen drive, and the like. In an example, machine-readable storage medium 504 may be a non-transitory machine-readable medium. Machine-readable storage medium 504 may store instructions 506, 508, 510, 512, and 514. In an example, instructions 506 may be executed by processor 502 to generate a checksum of a file during transition of the file from a normal state to a retained state. Instructions 508 may be executed by processor 502 to store the generated checksum in a database embedded within the file system, wherein the checksum may represent a content address of the file in the database. Instructions 510 may be executed by processor 502 to query the database with the content address of the file. Instructions 512 may be executed by processor 502 to retrieve a location address of the file corresponding to the content address of the file. Instructions 514 may be executed by processor 502 to use the location address of the file to provide access to the file in the file system. In an example, instructions 514 may include instructions to perform a search for the file in the file system using the location address of the file, and instructions to retrieve a file handle of the file from the file system.

For the purpose of simplicity of explanation, the example methods of FIGS. 3 and 4 are shown as executing serially, however it is to be understood and appreciated that the present and other examples are not limited by the illustrated order. The example systems of FIGS. 1, 2 and 5, and methods of FIGS. 3 and 4 may be implemented in the form of a computer program product including computer-executable instructions, such as program code, which may be run on any suitable computing device in conjunction with a suitable operating system (for example, Microsoft Windows, Linux, UNIX, and the like). Embodiments within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It may be noted that the above-described examples of the present solution is for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The invention claimed is:

1. A method of using location addressed storage as content addressable storage (CAS), comprising:
   generating, by a processor, a checksum of a file during transition of a file to a retained state in a file system;
   storing, by the processor, the generated checksum in a database, wherein the checksum represents a content address of the file in the database;
   storing in the database, by the processor, a location address of the file mapped to the content address of the file;
   querying, by the processor, the database with the content address, the content address being provided for the querying by a client application requesting access to the file;
   retrieving from the database, by the processor, the location address of the file mapped in the database to the content address of the file; and
   using, by the processor, the location address retrieved from the database to provide access to the file in the file system to the client application, wherein the client application accesses the file in the file system based on the location address.

2. The method of claim 1, wherein using the location address retrieved from the database to provide access to the file in the file system includes:
   performing a search for the file in the file system using the location address of the file;
   retrieving a file handle of the file from the file system; and
   sharing the file handle of the file with the client application requesting access to the file, wherein the client application accesses the file at the file system using the file handle retrieved based on the location address.

3. The method of claim 1, wherein the database is integrated into the file system.

4. The method of claim 1, wherein the content address of the file is received from an application requesting access to the file in the file system.

5. The method of claim 1, wherein the client application is a content addressable storage (CAS) client application.

6. The method of claim 1, wherein the database has a pipelined architecture that batches updates that are decoupled from queries, and the database has multiple stages that can be queried independently.

7. The method of claim 1, wherein
   the file prior to transition to the retained state is subject to content change and is location addressable, and
   the file in the retained state cannot be modified and is content addressable.

8. A system comprising:
   a database to store a hash of a file;
   a processor; and
   a machine-readable medium storing instructions that, when executed, cause the processor to,
      generate the hash of the file during transition of the file to a retained state in a scale-out file system, wherein the hash represents a content address of the file in the database,
      store the hash of the file in the database,
      store, in the database, a location address of the file mapped to the hash of the file,
      query the database with the content address of the file in response to a request from a client application to access the file, wherein the request identifies the file by the content address,
      retrieve the location address of the file mapped to the content address of the file from the database, and
      use the location address of the file to provide access to the file in the scale-out file system to the client application, wherein the client application accesses the file in the scale-out file system based on the location address.

9. The system of claim 8, wherein the client application is present on a communicatively coupled client system.

10. The system of claim 8, wherein the machine-readable medium stores instructions that, when executed, cause the processor to:
    perform a search for the file in the file system using the location address of the file,
    retrieve a file handle of the file from the file system, and
    share the file handle of the file with the client application requesting access to the file, client application accesses the file using the file handle retrieved based on the location address.

11. The system of claim 8, wherein the machine-readable medium stores instructions that, when executed, cause the processor to:
generate a journal for the hash generated during transition of the file to the retained state, and
process the journal by storing the hash of the file in the database.

12. The system of claim 8, wherein the database has a pipelined architecture that batches updates that are decoupled from queries, and the database has multiple stages that can be queried independently.

13. The system of claim 8, wherein
the file prior to transition to the retained state is subject to content change and is location addressable, and
the file in the retained state cannot be modified and is content addressable.

14. A non-transitory machine-readable storage medium comprising instructions executable by a processor to:
generate a checksum of a file during transition of a file to a retained state in a file system;
store the generated checksum in a database embedded within the file system, wherein the checksum represents a content address of the file in the database;
store in the database a location address of the file mapped to the content address of the file;
query the database with the content address of the file, the content address being provided by a client application requesting access to the file;
retrieve from the database the location address of the file mapped in the database to the content address of the file; and
use the location address retrieved from the database to provide access to the file in the file system to the client application, wherein the client application accesses the file in the file system based on the location address.

15. The storage medium of claim 14, wherein the instructions to use the location address of the file to provide access to the file in the file system comprise instructions to:
perform a search for the file in the file system using the location address of the file;
retrieve a file handle of the file from the file system; and
share the file handle of the file with the client application requesting access to the file, wherein the client application accesses the file at the file system using the file handle retrieved based on the location address.

16. The storage medium of claim 14, wherein the file system is a Network Attached Storage (NAS) file system.

17. The storage medium of claim 14, wherein the database is to allow pipelining of updates and independent querying of the pipelined updates.

18. The storage medium of claim 14, wherein
the file prior to transition to the retained state is subject to content change and is location addressable, and
the file in the retained state cannot be modified and is content addressable.

* * * * *